United States Patent
Sirbasku et al.

(10) Patent No.: US 11,799,391 B2
(45) Date of Patent: Oct. 24, 2023

(54) DIODE MOUNTING RING WITH CONTACT BAND INSERTS

(71) Applicant: Hamilton Sundstrand Corporation, Charlotte, NC (US)

(72) Inventors: Kyle S. Sirbasku, Rockford, IL (US); Dhaval Patel, Schaumburg, IL (US); Andrew R. Wilkinson, Cherry Valley, IL (US); Mary Christelle Ann Calacal, Rockford, IL (US); Yaser J. Isa, Cherry Valley, IL (US); Edward C. Allen, Davis, IL (US); Duane C. Johnson, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 44 days.

(21) Appl. No.: 17/200,823

(22) Filed: Mar. 13, 2021

(65) Prior Publication Data

US 2022/0294315 A1    Sep. 15, 2022

(51) Int. Cl.
  *H02M 7/34*    (2006.01)
  *H02M 7/00*    (2006.01)
  *H02M 7/02*    (2006.01)
  *H02K 11/042*  (2016.01)

(52) U.S. Cl.
  CPC ............. *H02M 7/34* (2013.01); *H02M 7/003* (2013.01); *H02M 7/02* (2013.01); *H02K 11/042* (2013.01)

(58) Field of Classification Search
  CPC .............................. H02M 7/003; H02M 7/34
  See application file for complete search history.

(56) References Cited

U.S. PATENT DOCUMENTS

| 4,492,887 | A | 1/1985 | Baldwin | |
|---|---|---|---|---|
| 5,219,617 | A * | 6/1993 | Howard | C23C 22/37 148/272 |
| 5,451,731 | A * | 9/1995 | Yoshizumi | H01H 33/168 218/2 |
| 10,460,861 | B1 | 10/2019 | Patel et al. | |
| 10,879,772 | B2 | 12/2020 | Patel et al. | |
| 2008/0218035 | A1* | 9/2008 | Naghshineh | H02K 11/042 310/71 |
| 2013/0300231 | A1 | 11/2013 | Grosskopf et al. | |

(Continued)

FOREIGN PATENT DOCUMENTS

| EP | 2773031 A2 | 9/2014 |
|---|---|---|
| EP | 3758201 A1 | 12/2020 |
| GB | 2473535 A | 3/2011 |

OTHER PUBLICATIONS

Extended European Search Report for European Patent Application No. EP22161302.9, dated Sep. 6, 2022.

*Primary Examiner* — Peter M Novak
(74) *Attorney, Agent, or Firm* — Locke Lord LLP; Joshua L. Jones; Gabrielle L. Gelozin

(57) ABSTRACT

An assembly comprises a mounting ring for a rotating rectifier assembly (RRA) having a pin bore defined in the mounting ring oriented in an axial direction and at least one contact band seated in a the pin bore of the mounting ring for mounting a direct current (DC) pin to the mounting ring. A method comprises forming a mounting ring for a rotating rectifier assembly (RRA), including forming a pin bore in the mounting ring oriented in an axial direction, and installing at least one contact band into a the pin bore of the mounting ring.

14 Claims, 4 Drawing Sheets

(56) References Cited

U.S. PATENT DOCUMENTS

| | | |
|---|---|---|
| 2014/0226383 A1 | 8/2014 | Brust et al. |
| 2015/0131233 A1* | 5/2015 | Kawauchi .............. H05K 7/209 |
| | | 361/715 |
| 2016/0226348 A1* | 8/2016 | Rittmeyer ............ H02K 11/042 |
| 2018/0316248 A1 | 11/2018 | Patel et al. |
| 2019/0390783 A1 | 12/2019 | Jedlinski et al. |
| 2020/0220426 A1 | 7/2020 | Horng et al. |

* cited by examiner

DIODE MOUNTING RING WITH CONTACT BAND INSERTS

BACKGROUND

1. Field

This disclosure relates generally to electrical machines and more particularly to diode mounting rings for rotating rectifier assemblies for generators.

2. Description of Related Art

The rotating rectifier assembly (RRA) is mounted in the rotor shaft of a variable frequency generator (VFG). It is used to convert alternating current to direct current using a full bridge rectifier configuration.

Two mounting rings are located in the RRA. Each one is connected to the AC (alternating current) power source through three diodes. The diodes the convert the alternating current to direct current, which is then transmitted from the body of the mounting ring to the contact band connected to the DC (direct current) pins. The DC pins connect the RRA to the resistor assembly and to the main field winding of the VFG.

In traditional configurations, the RRA uses two mounting rings with brazed pins to make the DC connections. The braze joints can weaken the material. The mounting rings are traditionally made of Beryllium Copper (BeCu), which is a potential health hazard when machined.

The conventional techniques have been considered satisfactory for their intended purpose. However, there is an ever present need for improved systems and methods for mounting diode pins within a generator. This disclosure provides a solution for this need.

SUMMARY

An assembly comprises a mounting ring for a rotating rectifier assembly (RRA) having a pin bore defined in the mounting ring oriented in an axial direction and at least one contact band seated in a the pin bore of the mounting ring for mounting a direct current (DC) pin to the mounting ring.

A respective joining interface can be formed between each of the at least one contact bands and the mounting ring, wherein the joining interface can be free of braze and each respective joining interface of the at least one contact bands can be an interference fit. The at least one contact band can include a first contact band and a second contact band. The first contact band can be axially stacked with the second contact band within the pin bore. The contact bands can be spring type contact bands. The mounting ring can be of Aluminum, the at least one contact band can be of a metallic material, and both the mounting ring and at least one contact band can be free of BeCu.

At least one axial channel can be included on a radially outer surface of the mounting ring for accommodating a DC pin of another mounting ring in the RRA. At least one circumferential coolant channel can be defined on an outward surface of the mounting ring. A DC pin can be seated in the at least one contact band.

The mounting ring can be a first mounting ring, and the DC pin can be a first DC pin. A second mounting ring for an RRA having a pin bore defined in the second mounting ring oriented in the axial direction can be included. At least one contact band seated in a the pin bore of the second mounting ring and a second DC pin can be seated in the at least one contact band of the second mounting ring. The second DC pin can pass through an axial channel on a radially outer surface of the first mounting ring. The first and second mounting rings can be assembled into the RRA of a variable frequency generator (VFG). The first and second DC pins can electrically connect between diodes and a field winding of the VFG for rectifying alternating current (AC) to DC in the RRA.

A method includes forming a mounting ring for a rotating rectifier assembly (RRA) and forming a pin bore in the mounting ring oriented in an axial direction. The method also includes installing at least one contact band into a the pin bore of the mounting ring.

The method can include mounting a direct current (DC) pin to the mounting ring by seating the DC pin in the at least one contact band. The method can also include assembling the mounting ring into an RRA, wherein mounting ring is a first mounting ring, and the DC pin is a first DC pin. The method can include assembling a second a mounting ring to the RRA can be included, wherein a pin bore can be defined in the second mounting ring oriented in the axial direction, and at least one contact band can be seated in a the pin bore of the second mounting ring. The method can include mounting a second DC pin seated in the at least one contact band of the second mounting ring, wherein the second DC pin can pass through an axial channel on a radially outer surface of the first mounting ring.

The contact bands can be spring type contact bands and are assembled with interference fits into the respective first and second mounting rings without braze. The first and second mounting rings can be assembled into the RRA of a variable frequency generator (VFG). The method can also include electrically connecting the first and second DC pins between diodes and a field winding of the VFG for rectifying AC to DC in the RRA.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
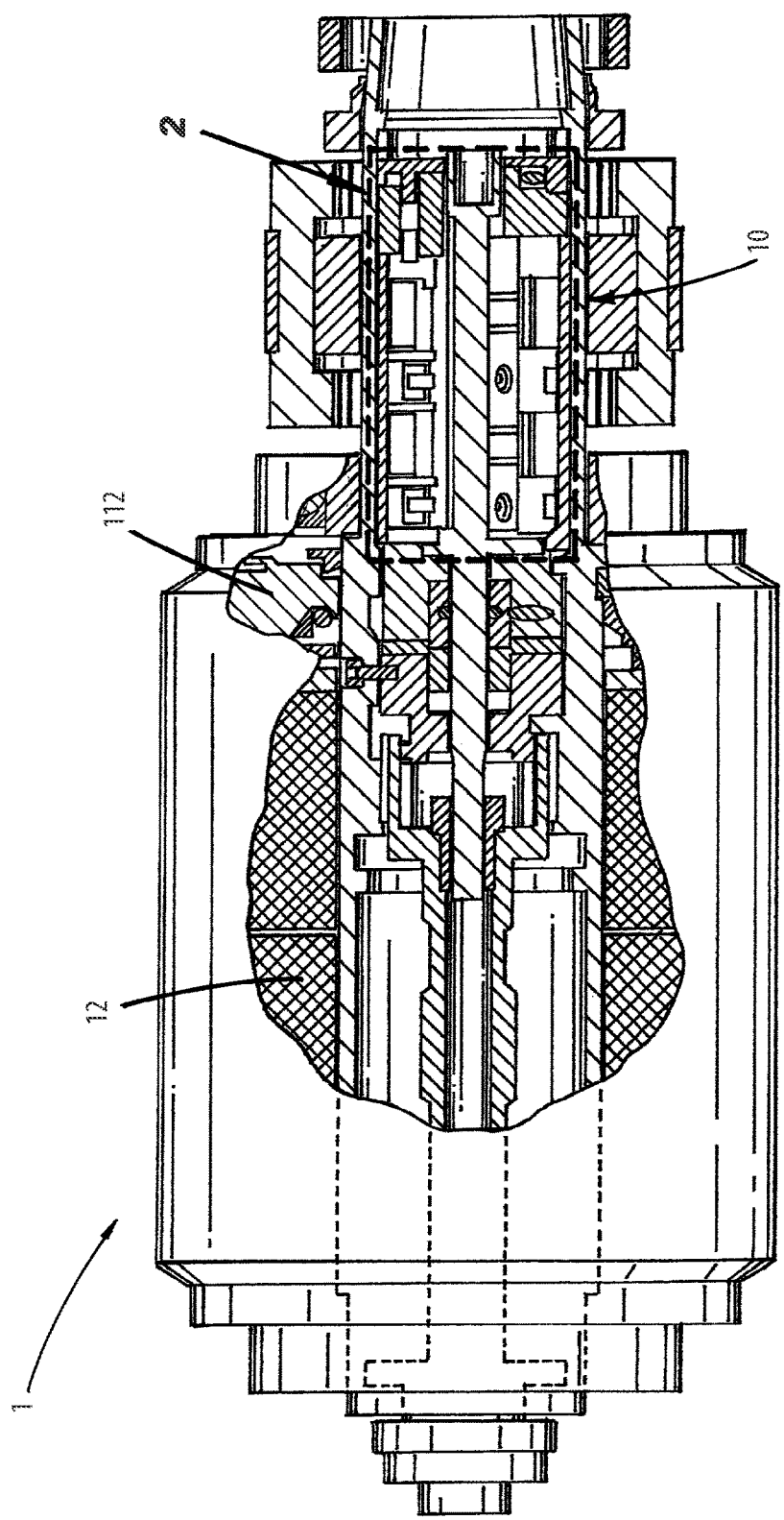
FIG. 1 is a schematic cross-sectional view of an embodiment of a generator constructed in accordance with the present disclosure, showing a rotating rectifier assembly.
Figure 2:
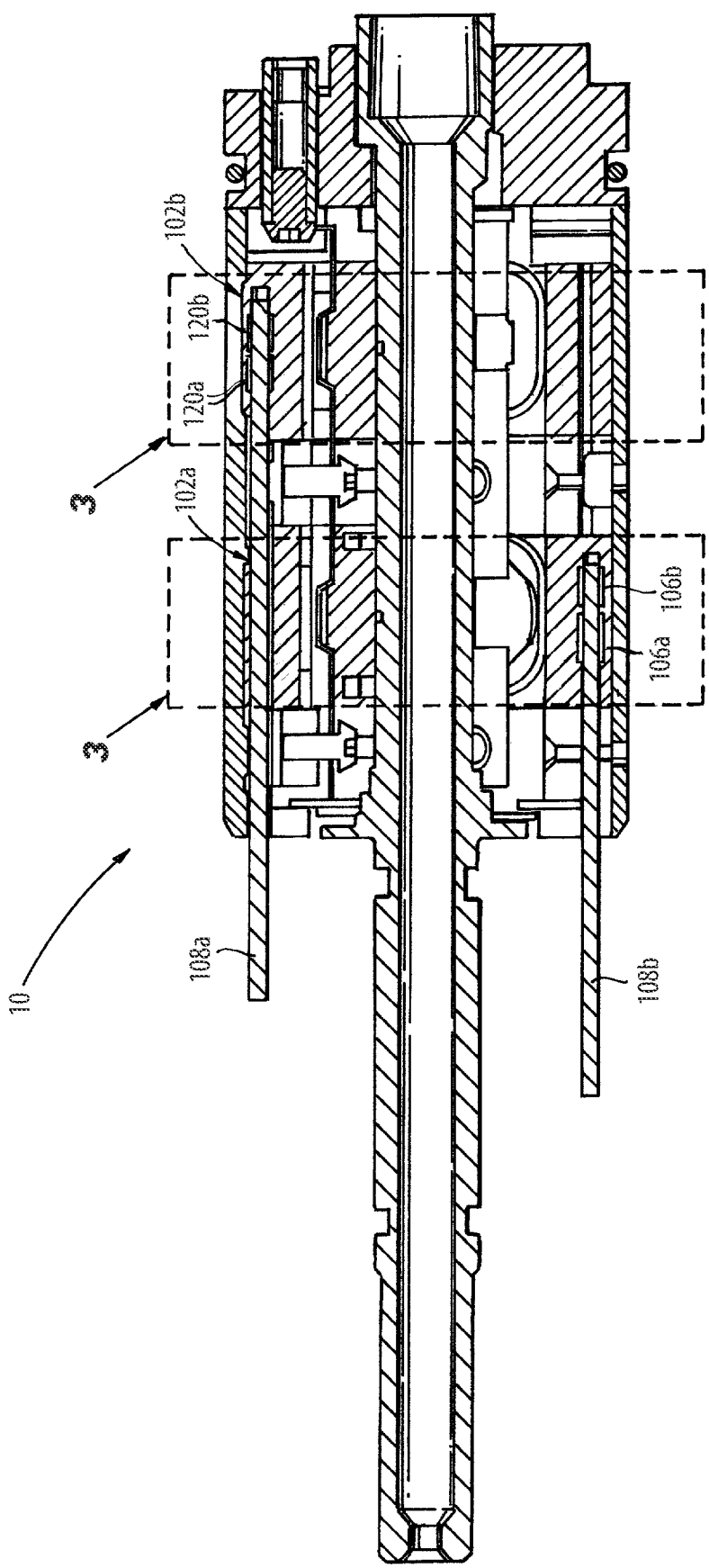
FIG. 2 is a schematic cross sectional view of the rotating rectifier assembly of FIG. 2, showing a mounting ring assembly.

Reference will now be made to the drawings wherein like reference numerals identify similar structural features or aspects of the subject disclosure. For purposes of explanation and illustration, and not limitation, a partial view of an embodiment of an assembly in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to improve conductivity of a rotating rectifier assembly.

Shown in FIG. 1, an assembly 100 can included a mounting ring 102 for a rotating rectifier assembly (RRA) 10 which can be mounted in a generator 1 (e.g. a brushless and/or variable frequency generator (VFG)). The mounting ring 102 can have a pin bore 104 defined in the mounting ring 102 oriented in an axial direction (e.g. along axis A). In embodiments, the mounting ring 102 can be of Aluminum, however any suitable conductive material can be used.

At least one contact band 106 can be seated in the pin bore 104 of the mounting ring 102 for mounting a direct current (DC) pin 108 to the mounting ring 102. The at least one contact band 106 can allow for precise, durable positioning of the DC pin 108 within the mounting ring 102. The at least one contact band 106 can be of a metallic material, for example a material that allows the DC pin 108 to electrically connect between diodes 110 and a field winding 112 of the VFG 1 for rectifying alternating current (AC) to DC in the RRA 10. Both the mounting ring 102 and at least one contact band 106 can be free of BeCu, however it is contemplated that the entire assembly 100 as described herein can be free of BeCu.

A respective joining interface 114 can be formed between each of the at least one contact bands 106 and the mounting ring 102. Brazing the DC pin 108 to the mounting ring 102 can weaken the assembly 100, therefore the joining interface 114 can be free of braze. Each respective joining interface 114 of the at least one contact band 106 can be an interference fit, for example, the at least one contact band 106 can be spring type contact band. The at least one contact band 106 can include a first contact band 106a and a second contact band 106b. The first contact band 106a can be axially stacked with the second contact band 106b within the pin bore 104.

Figure 3:
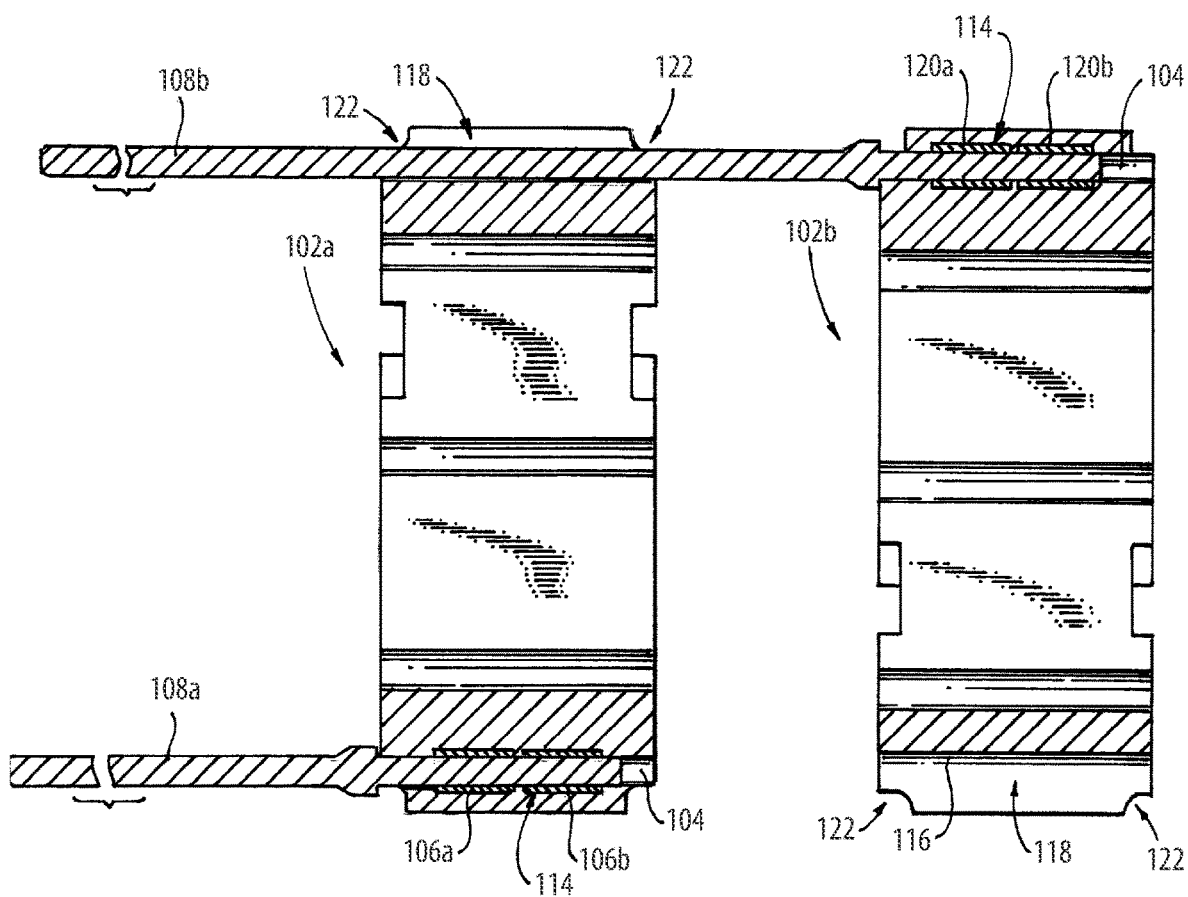
FIG. 3 is a schematic cross sectional view of the mounting ring assembly of FIG. 2.
Figure 4:
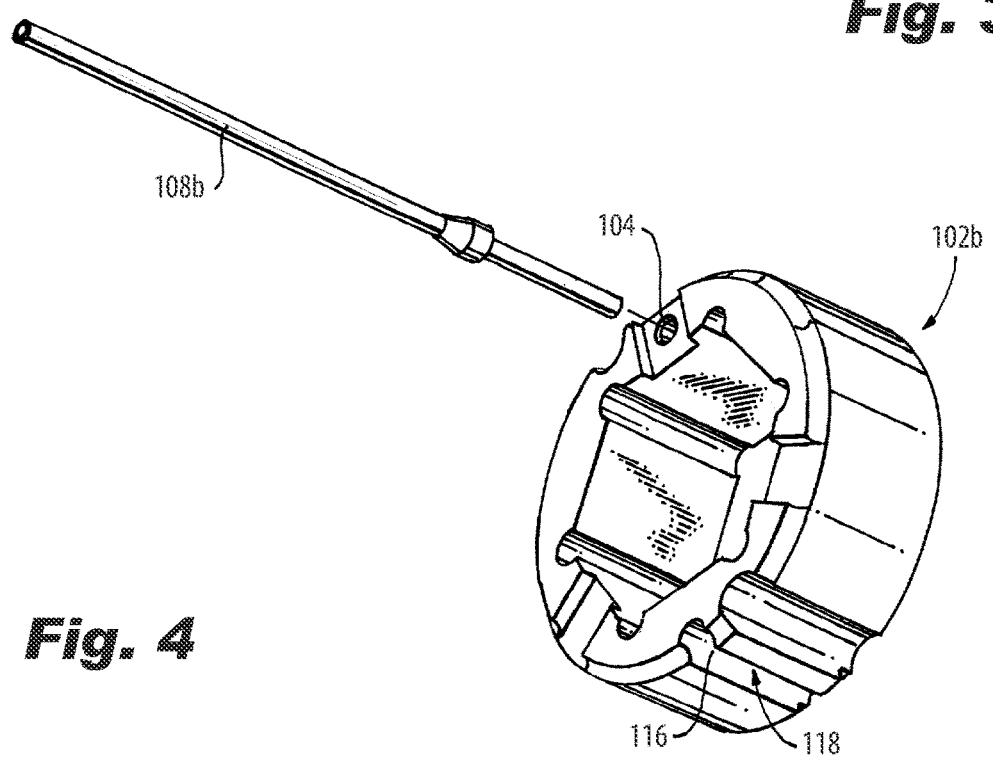
FIG. 4 is a perspective view of the mounting ring assembly of FIG. 3.

At least one axial channel 116 can be included on a radially outer surface 118 of the mounting ring 102 for accommodating a DC pin 108 of another mounting ring 102 in the RRA10. For example, the mounting ring 102 can be a first mounting ring 102a and the assembly 100 can include a second mounting ring 102b, and the DC pin 108 can be a first DC pin 108. The second a mounting ring 102b can also have a pin bore 104b defined therein in the axial direction, as described for the mounting ring 102a. The second mounting ring 102b can also include at least one contact band 120a,b seated within the pin bore 104b The second DC pin 108b can pass through the axial channel 116 of the first mounting ring 102a, and through the pin bore 104b of the second mounting ring 102b, as shown in FIGS. 3-4. At least one circumferential coolant channel 122 can be defined on radially outer surface 118 of the mounting ring 102a,b, for example, each mounting ring 102a,b can include a coolant channel 122 on each axial end of the mounting ring 102a,b.

Figure 5:
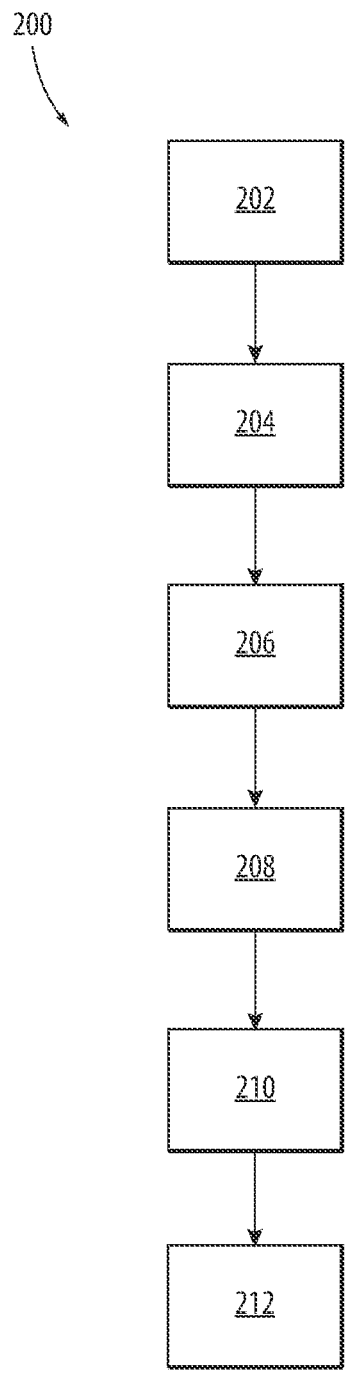
FIG. 5 is a schematic box diagram of a method in accordance with at least one aspect of this disclosure.

Shown in FIG. 5. method 200 comprises forming a mounting ring 102 for an RRA 10, including forming 202 a pin bore 104 in the mounting ring 102 oriented in an axial direction, and installing 204 at least one contact band 106 into a the pin bore 104 of the mounting ring 102. The method 200 can include mounting 206 a DC pin to the mounting ring 102 by seating the DC pin 108 in the at least one contact band 106. The method 200 can also include assembling 208 the mounting ring into the RRA 10.

Assembling 210 a second a mounting ring 102b to the RRA 10 can be included in the method 200, wherein a pin bore 104b can be defined in the second mounting ring 102b oriented in the axial direction, and at least one contact band 120a,b can be seated in the pin bore 104b of the second mounting ring 102b. The method 200 can further include mounting 212 a second DC pin 108b seated in the at least one contact band 120a,b of the second mounting ring 102b, wherein the second DC pin 108b can pass through an axial channel 116 on a radially outer surface 118 of the first mounting ring 102a.

The methods and systems of the present disclosure, as described above and shown in the drawings, provide for decreased complexity in assembly, reduced manufacturing cost and compliance requirements, improved cooling and thermal conductivity, and improved conductivity. While the apparatus and methods of the subject disclosure have been shown and described, those skilled in the art will readily appreciate that changes and/or modifications may be made thereto without departing from the scope of the subject disclosure.

What is claimed is:

1. An assembly system comprising:
   a first assembly, comprising:
      a first mounting ring for a rotating rectifier assembly (RRA), wherein a pin bore is defined in the first mounting ring oriented in an axial direction, and at least one axial channel is defined on a radially outer surface of the first mounting ring; and
      at least one contact band seated in the pin bore of the first mounting ring for mounting a first direct current (DC) pin to the first mounting ring;
      the first DC pin seated in the at least one contact band; and
   a second assembly, comprising:
      a second a mounting ring for an RRA, wherein a pin bore is defined in the second mounting ring oriented in the axial direction;
      at least one contact band seated in the pin bore of the second mounting ring; and
      a second DC pin seated in the at least one contact band of the second mounting ring, wherein the second DC pin passes through the axial channel on the radially outer surface of the first mounting ring to connect the second assembly to the first assembly,
   wherein at least one circumferential coolant channel is defined on an outward surface of the first mounting ring.

2. The assembly system as recited in claim 1, wherein a respective joining interface is formed between a respective contact band of the at least one contact band and a respective mounting ring of the first or second mounting rings, wherein the joining interface is free of braze.

3. The assembly system as recited in claim 2, wherein each respective joining interface between the respective contact band the respective mounting ring is an interference fit.

4. The assembly system as recited in claim 1, wherein the at least one contact band of the first assembly or the second assembly includes a first contact band and a second contact band, wherein the first contact band is axially stacked with the second contact band within the pin bore.

5. The assembly system as recited in claim 1, wherein the first mounting ring and/or the second mounting ring is of Aluminum.

6. The assembly system as recited in claim 1, wherein the at least one contact band of the first assembly or the second assembly is of a metallic material.

7. The assembly system as recited in claim 1, wherein the assembly system is free of Beryllium Copper (BeCu).

8. The assembly system as recited in claim 1, wherein the contact bands of the first assembly and/or the contact bands of the second assembly are spring type contact bands.

9. The assembly system as recited in claim 1, wherein the first and second mounting rings are assembled into the RRA of a variable frequency generator (VFG).

10. The assembly system as recited in 9, wherein the first and second DC pins electrically connect between diodes and a field winding of the VFG for rectifying alternating current (AC) to DC in the RRA.

11. A method comprising:
forming a first mounting ring for a rotating rectifier assembly (RRA), including forming a pin bore in the first mounting ring oriented in an axial direction, forming an axial channel on a radially outer surface of the first mounting ring, and forming at least one circumferential coolant channel on an outward surface of the first mounting ring;
installing at least one contact band into the pin bore of the first mounting ring;
mounting a first direct current (DC) pin to the first mounting ring by seating the first DC pin in the at least one contact band of the first mounting ring,
assembling the first mounting ring into an RRA;
forming a second mounting ring, including forming a pin bore in the second mounting ring oriented in an axial direction;
assembling the second mounting ring to the RRA,
installing at least one contact band into the pin bore of the second mounting ring; and
mounting a second DC pin in the at least one contact band of the second mounting ring; and
mounting the second DC pin through an axial channel on a radially outer surface of the first mounting ring.

12. The method as recited in claim 11, wherein the contact bands are spring type contact bands and are assembled with interference fits into the respective first and second mounting rings without braze.

13. The method as recited in claim 11, wherein the first and second mounting rings are assembled into the RRA of a variable frequency generator (VFG).

14. The method as recited in 13, further comprising electrically connecting the first and second DC pins between diodes and a field winding of the VFG for rectifying AC to DC in the RRA.

* * * * *